United States Patent
Ryon et al.

(10) Patent No.: US 12,416,410 B2
(45) Date of Patent: Sep. 16, 2025

(54) FUEL INJECTORS FOR MULTIPOINT ARRAYS

(71) Applicant: Collins Engine Nozzles, Inc., Des Moines, IA (US)

(72) Inventors: Jason A. Ryon, Carlisle, IA (US); Lev A. Prociw, Johnston, IA (US); Gregory A. Zink, Des Moines, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 18/418,534

(22) Filed: Jan. 22, 2024

(65) Prior Publication Data
US 2024/0401810 A1    Dec. 5, 2024

Related U.S. Application Data

(60) Division of application No. 17/064,766, filed on Oct. 7, 2020, now Pat. No. 11,906,167, which is a continuation of application No. 15/476,362, filed on Mar. 31, 2017, now Pat. No. 10,859,269.

(51) Int. Cl.
*F23R 3/60* (2006.01)
*F23R 3/28* (2006.01)
*F02C 7/20* (2006.01)

(52) U.S. Cl.
CPC ............ *F23R 3/283* (2013.01); *F23R 3/60* (2013.01); *F02C 7/20* (2013.01); *F23R 2900/00017* (2013.01)

(58) Field of Classification Search
CPC ............ F23R 3/50; F23R 2900/03041; F23R 2900/03042; F23R 3/283; F23R 3/60
See application file for complete search history.

(56) References Cited

U.S. PATENT DOCUMENTS

| | | | |
|---|---|---|---|
| 3,018,624 A | 1/1962 | Bonsall et al. | |
| 3,273,343 A | 9/1966 | Cretella | |
| 3,453,826 A | 7/1969 | Hering | |
| 4,374,466 A * | 2/1983 | Sotheran | F23R 3/16 60/749 |

(Continued)

FOREIGN PATENT DOCUMENTS

| | | |
|---|---|---|
| EP | 0495587 A1 | 7/1992 |
| EP | 2589877 A2 | 5/2013 |
| EP | 3076082 A1 | 10/2016 |

OTHER PUBLICATIONS

Extended European Search Report dated Aug. 14, 2018, issued during the prosecution of corresponding European Patent Application No. EP 1816329.1.

*Primary Examiner* — Gerald L Sung
(74) *Attorney, Agent, or Firm* — Kinney & Lange, P.A.

(57) ABSTRACT

A combustor dome system includes an annular combustor dome defining a main axis therethrough. The combustor dome includes opposed upstream and downstream faces, wherein the upstream face is configured to face upstream toward a compressor discharge space, wherein the downstream face is configured to face downstream toward a combustor space. The downstream face has a curved cross-sectional profile. A plurality of nozzles extends at least partially through the combustor dome from the upstream face to the downstream face for injection of fuel into the combustor space. A fuel manifold is in fluid communication with the plurality of nozzles.

20 Claims, 5 Drawing Sheets

(56) References Cited

U.S. PATENT DOCUMENTS

| | | | |
|---|---|---|---|
| 4,763,482 A | | 8/1988 | Wehner |
| 4,955,201 A | | 9/1990 | Shekleton et al. |
| 5,195,315 A | | 3/1993 | Holladay |
| 5,323,604 A | | 6/1994 | Ekstedt et al. |
| 5,465,571 A | * | 11/1995 | Clark ................ F23R 3/283 |
| | | | 60/800 |
| 5,524,430 A | | 6/1996 | Mazeaud et al. |
| 6,212,870 B1 | | 4/2001 | Thompson et al. |
| 6,250,062 B1 | | 6/2001 | Lawen, Jr. et al. |
| 6,360,525 B1 | * | 3/2002 | Senior ................. F23R 3/12 |
| | | | 60/776 |
| 6,684,642 B2 | | 2/2004 | Willis et al. |
| 7,716,933 B2 | | 5/2010 | Prociw et al. |
| 8,146,837 B2 | | 4/2012 | Thomson et al. |
| 8,313,046 B2 | | 11/2012 | Short |
| 9,003,802 B2 | | 4/2015 | Hernandez et al. |
| 9,003,804 B2 | | 4/2015 | Prociw |
| 9,587,833 B2 | | 3/2017 | Lee |
| 2003/0167771 A1 | | 9/2003 | Hayashi et al. |
| 2005/0034460 A1 | | 2/2005 | McMasters et al. |
| 2008/0053102 A1 | | 3/2008 | Al-Roub et al. |
| 2008/0105237 A1 | | 5/2008 | Gandza |
| 2012/0198853 A1 | | 8/2012 | Hernandez et al. |
| 2012/0204575 A1 | | 8/2012 | Carlisle |
| 2013/0174562 A1 | * | 7/2013 | Holcomb ............ F23R 3/002 |
| | | | 60/752 |
| 2013/0214063 A1 | | 8/2013 | Ryon et al. |
| 2014/0075949 A1 | | 3/2014 | Prociw |
| 2014/0318138 A1 | | 10/2014 | Bunel et al. |
| 2015/0108236 A1 | | 4/2015 | Buelow et al. |
| 2016/0377293 A1 | | 12/2016 | Short et al. |
| 2017/0268782 A1 | * | 9/2017 | Huang ................. F02C 9/26 |

\* cited by examiner

FUEL INJECTORS FOR MULTIPOINT ARRAYS

CROSS-REFERENCE TO RELATED APPLICATIONS

This is a divisional of U.S. patent application Ser. No. 17/064,766 filed Oct. 7, 2020, which is a continuation of U.S. patent application Ser. No. 15/476,362 filed Mar. 31, 2017, now U.S. Pat. No. 10,859,269 granted Dec. 8, 2020, the contents of which are incorporated by reference herein in their entirety.

BACKGROUND OF THE INVENTION

1. Field of the Invention

The present invention relates to multipoint injection, and more particularly to multipoint fuel injection such as in gas turbine engines.

2. Description of Related Art

In the early 2000's, the ability of a multipoint lean direct injection (LDI) concept was demonstrated to achieve very low NOx emissions index (EI) levels. The program was successful in demonstrating the ability of the multipoint concept to deal with NOx at high power conditions but was not optimized to perform equally as well at low power conditions such as start, ground idle, and flight idle conditions.

Conventional methods and systems have generally been considered satisfactory for their intended purpose. However, there is still a need in the art for a multipoint fuel injection arrangement that allows for improved performance at high and low power operation while significantly reducing NOx emissions. There also remains a need in the art for such a multipoint fuel injection arrangement that is easy to make and use. This disclosure provides a solution for these needs.

SUMMARY OF THE INVENTION

A combustor dome system includes an annular combustor dome defining a main axis therethrough. The combustor dome includes opposed upstream and downstream faces, wherein the upstream face is configured to face upstream toward a compressor discharge space, wherein the downstream face is configured to face downstream toward a combustor space. The downstream face has a curved cross-sectional profile. A plurality of nozzles extends at least partially through the combustor dome from the upstream face to the downstream face for injection of fuel into the combustor space. A fuel manifold is in fluid communication with the plurality of nozzles.

The annular dome can include an upper cross-section and a lower-cross section, wherein in each of the upper and lower cross-sections, there is symmetry in the curved cross-sectional profile across a cylinder defined about the main axis and extending downstream from downstream face of the combustor dome. The cylinder can divide the combustor space into an inner space inside the cylinder and an outboard space outside the cylinder, wherein some of the plurality of nozzles are radially inboard relative to the cylinder, and some of nozzles in the plurality of nozzles are radially outboard relative to the cylinder. The nozzles of the plurality of nozzles that are radially inboard of the cylinder can be angled outward toward the cylinder. The nozzles of the plurality of nozzles that are radially outboard of the cylinder can be angled inward toward the cylinder.

Each nozzle in the plurality of nozzles can include a nozzle assembly defining at least one of a fuel circuit and an air circuit therethrough, wherein the nozzle assembly extends along an injection axis. A plurality of supports can extend from the nozzle assembly to engage the combustor dome, the supports being circumferentially spaced apart from one another about the injection axis, wherein each support in the plurality of supports extends along a respective support axis. The support axes are circumferentially spaced apart around an insertion axis along which the nozzle assembly can be inserted during assembly into a combustor dome that is oblique relative to the injection axis Each support includes opposing side faces that are aligned with the insertion axis. Each support in the plurality of supports can be aerodynamically aligned with the injection axis. At least one of the supports can be swept on a non-perpendicular angle relative to the injection axis. At least one of the supports can include a fuel feed passage fluidly connected with a fuel circuit of the nozzle assembly for fluid communication of fuel from a manifold into the fuel circuit. The combustor dome can define an outer air flow passage therethrough for each nozzle aligned with the injection axis thereof, wherein the nozzle assembly is suspended in the outer air flow passage of the combustor dome with an outer air circuit defined through the outer air flow passage outboard of the nozzle assembly. The fuel manifold can be supported by fuel conduits that provide fluid communication from the fuel manifold to the plurality of nozzles. The manifold can hold the plurality of nozzles in place axially and forces them up against the dome to maintain a constant gap.

The dome can be configured to provide cooling due to air flowing therealong. The dome can be configured to provide partial channel heat transfer for cooling the dome and maintaining metering of air flow through an outer air circuit defined between the dome and each of the plurality of nozzles. The supports can provide alignment and concentricity for the nozzles.

A method of assembling a combustor dome system includes assembling a nozzle into a combustor dome that defines a main axis, wherein assembling includes inserting the nozzle into an outer air flow passage defined through the combustor dome in a direction aligned parallel with the main axis, wherein the nozzle itself is aligned along an injection axis that is oblique to the main axis during insertion.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
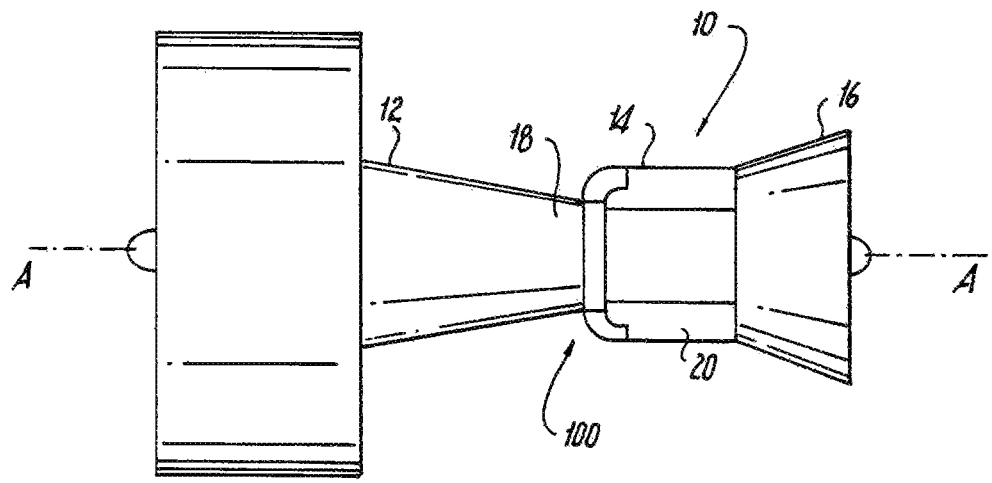
FIG. 1 is a schematic partially cross-sectional side elevation view of an exemplary embodiment of a gas turbine engine constructed in accordance with the present disclosure, showing upper and lower cross-sections of an annular combustor dome.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-7, as will be described. The systems and methods described herein can be used for multipoint injection, such as in gas turbine engines.

Gas turbine engine 10 includes a compressor section 12 for compressing air to an elevated pressure, a combustor section 14 for burning fuel in the compressed air, and a turbine section 16 for extracting energy from the heated, compressed air to generate shaft work and or exhaust thrust. Combustor dome system 100 is the portion of the combustor section 14 that separates the compressor space 18 of compressor 12 from the combustor space 20 of combustor section 14, and introduces fuel and air into the combustor space 20 for combustion.

Figure 2:
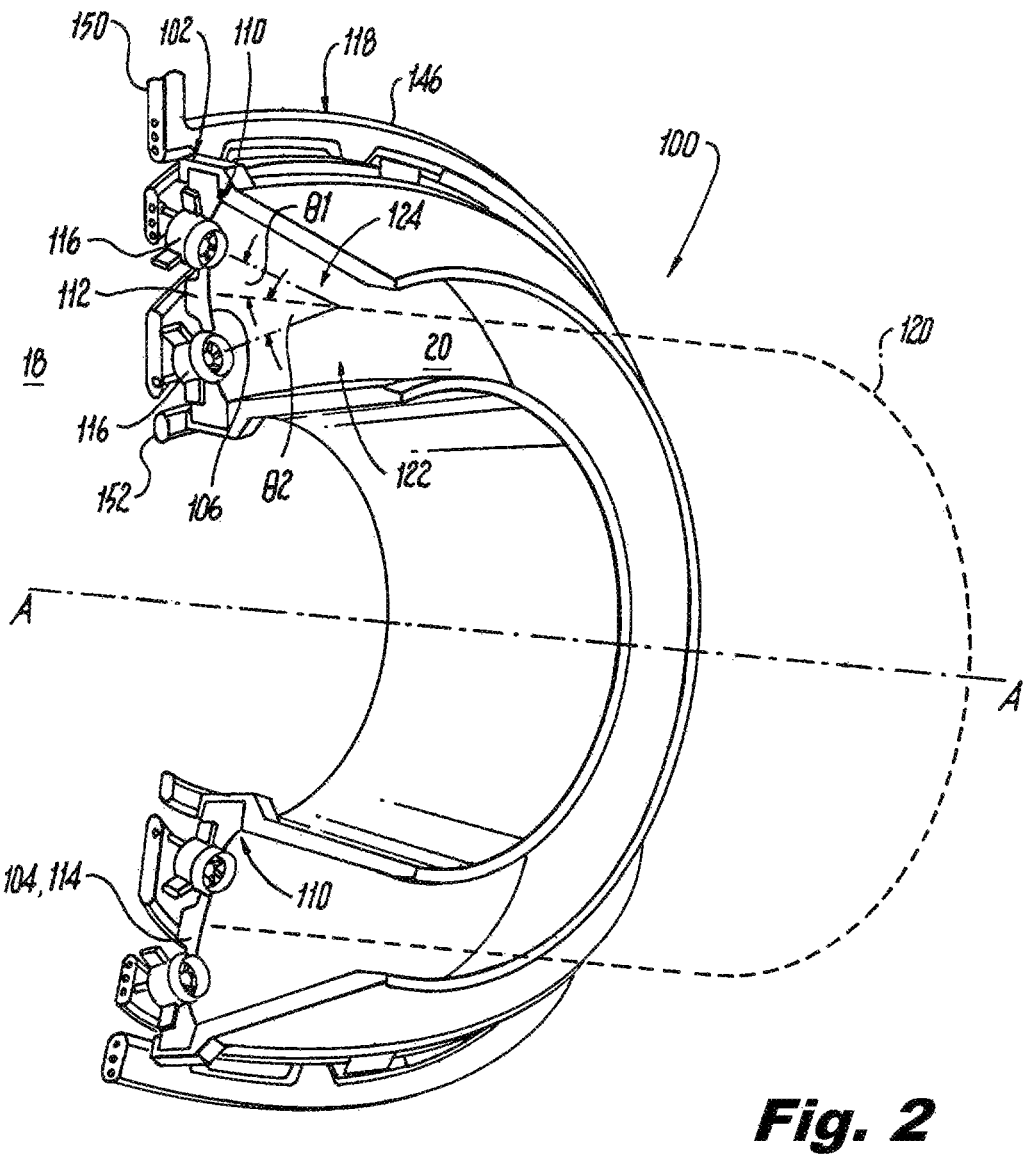
FIG. 2 is a cross-sectional perspective view of the annular combustor dome of FIG. 1, showing the curvature of the downstream surface of the combustor dome and the nozzle injection angles.

With reference now to FIG. 2, combustor dome system 100 includes an annular combustor dome 102 defining a main axis A therethrough. The combustor dome 102 includes opposed upstream and downstream faces 104 and 106, wherein the upstream face 104 is configured to face upstream toward a compressor discharge space 18, wherein the downstream face is configured to face downstream into combustor space 20. The downstream face 106 has a curved cross-sectional profile 110, which can be seen in both the upper and lower cross-sections 112 and 114 showing in FIG. 2. A plurality of nozzles 116 extends through the combustor dome 102 from the upstream face 104 to the downstream face 106 for injection of fuel into the combustor space 20. A fuel manifold 118 is in fluid communication with the plurality of nozzles 116 for delivery of the fuel from a fuel source to the nozzles 116.

Figure 3:
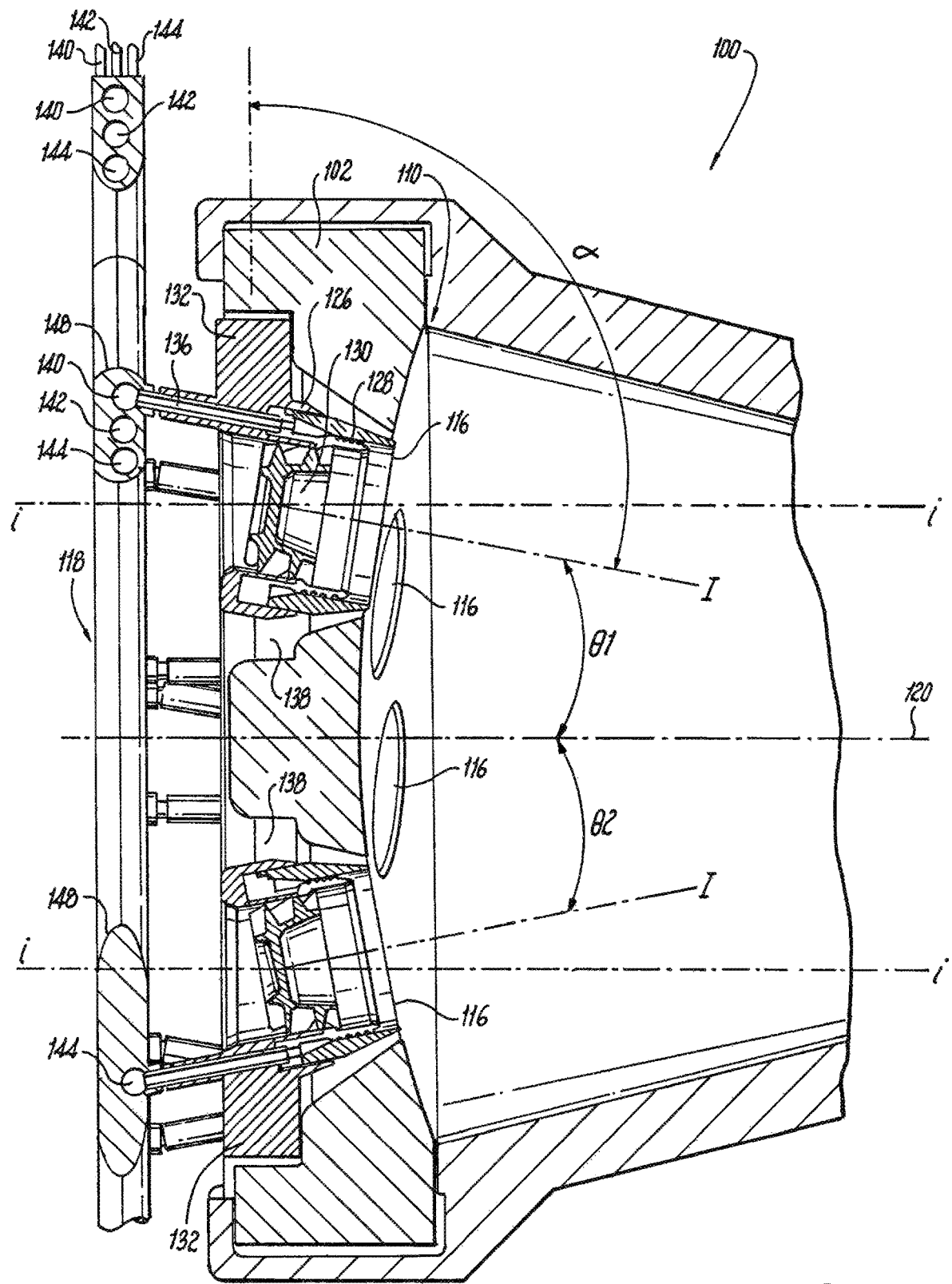
FIG. 3 is a cross-sectional side elevation view of the upper cross-section of the annular combustor dome of FIG. 1, showing inner and outer nozzles and the fuel manifold.

There can be symmetry in the curved cross-sectional profile (shown in both the upper and lower cross-sections 112 and 114 in FIG. 2, but present in all cross-sections) across a cylinder 120 defined about the main axis A and extending downstream from downstream face 106 of the combustor dome 102 (note that in FIG. 3, cylinder 120 appears as a line due to the cross-section and is not to be mistaken with axis A shown in FIG. 2). Those skilled in the art will appreciate that cylinder 120 is not an actual component, but a geometric reference. The cylinder 120 can divide the combustor space into an inner space 122 inside the cylinder 120 and an outboard space 124 outside the cylinder 120. Some of the plurality of nozzles 116 are radially inboard relative to the cylinder 120 (an inner set of nozzles 116), and some of nozzles 116 are radially outboard relative to the cylinder 120 (an outer set of nozzles 116). The nozzles 116 that are radially outboard of the cylinder 120 are angled inward toward the cylinder on angle θ1. The nozzles 116 that are radially inboard of the cylinder 120 are angled outward toward the cylinder 120 on angle θ2. There is also a central set of nozzles 116 radially between the inner and outer sets that are aligned with cylinder 120 and parallel to main axis A. Thus nozzles 116 conform in their injection angle to the curved cross-sectional profile 110 of the downstream surface 106 of combustor dome 102.

Figure 4:
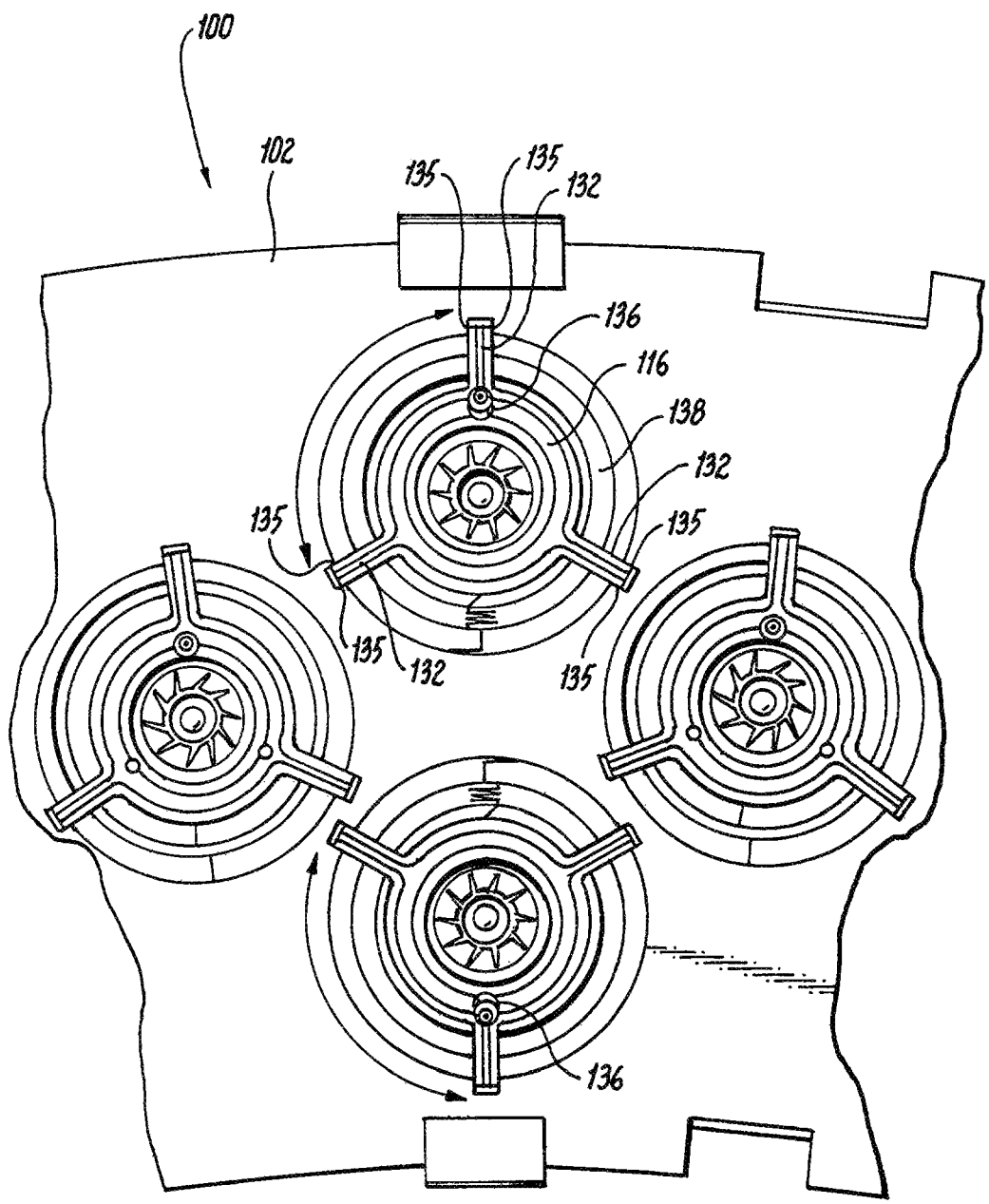
FIG. 4 is an upstream end elevation view of the combustor dome of FIG. 1, showing the nozzles and upstream surface of the combustor dome viewed from the compressor side.

Referring now to FIG. 3, each nozzle 116 includes a nozzle assembly 126 defining a fuel circuit 128 and an air circuit 130 therethrough, wherein the nozzle assembly 126 extends along an injection axis I, angled on converging/diverging angles θ1, θ2, or aligned with cylinder 120 as described above. The nozzle assembly 126 includes inner and outer fuel circuit components 154 and 156, a receptacle 158, and an air swirler 160 described below. Two or more supports 132 extend from each nozzle assembly 126 to engage the combustor dome 102 to support each nozzle 116 in the combustor dome 102. The three supports 132 are circumferentially spaced apart 120° from one another about the injection axis I, as shown in FIG. 4. Each support 132 extends along a respective support axis S, and it is these support axes S that are spaced apart circumferentially, 120° in this example. Those skilled in the art will readily appreciate that any other suitable angular spacing can be used between the supports 132, and it is advantageous structurally if the supports 132 are not collinear. Each support 132 in the plurality of supports includes side faces 134 shown in FIGS. 6 and 7. The side faces 134 of each support 132 are circumferentially spaced apart from the side faces of other supports 132 around an insertion axis i that is oblique relative to the injection axis I and parallel to the main axis A and cylinder 120. Each side face 134 is aligned with the respective insertion axis i so that nozzles 116 can be inserted into combustor dome 102 along insertion axes i that are all aligned parallel with main axis A. As shown in FIG. 4 each support 132 in the plurality of supports is aerodynamically aligned with the injection axis I, i.e. as vanes with no turning or swirl angle to reduce or minimize the wake caused in air flow past supports 132. Supports 132 of each nozzle 116 can be swept forward or backwards as needed on a non-perpendicular angle α relative to the injection axis I to provide the insertion axis i parallel to main axis A and cylinder 110. At least one of the supports 132 in each injector 116 can include a fuel feed passage 136 fluidly connected with the fuel circuit 128 of the nozzle assembly 126 for fluid communication of fuel from the manifold 118 into the fuel circuit 128.

Figure 6:
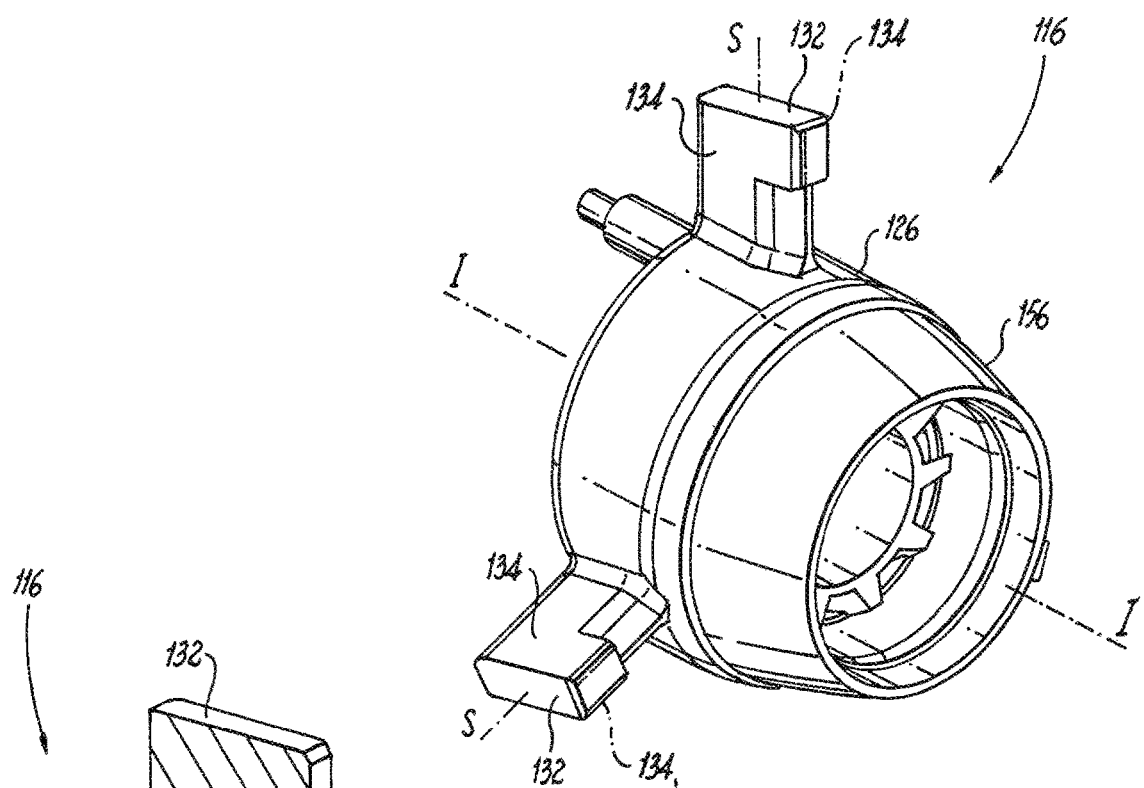
FIGS. 6 and 7 are perspective and cross-sectional perspective views of one of the nozzles of the system of FIG. 5, showing the supports and fuel and air circuits.

The groove side surfaces 135 shown in FIG. 4 are also aligned parallel to the support axis S, shown in FIG. 6 such that the groove is co-linear with the support axis S. The groove side surfaces 135 and corresponding side faces 134 of supports 132 are also aligned parallel with the insertion axis i. The tighter the gap between the support side wall 134 (shown in FIG. 6) and groove side wall 135 (shown in FIG. 4) the tighter constrained the component supports 132 will be and this gap can be minimized as to the point that assembly is still feasible. The groove end walls 135 extend beyond the end of each support 132 in the direction of support axis S. This still allows the grooves and the supports 132 to grow/shrink radially inwards/outwards from the insertion axis i.

With reference again to FIG. 3, the combustor dome 102 defines an outer air flow passage 138 therethrough for each nozzle 116 that is aligned with the injection axis I thereof. The nozzle assembly 126 is suspended in the outer air flow passage 138 of the combustor dome 102 with an outer air circuit defined through the outer air flow passage 138 outboard of the nozzle assembly 102. The fuel manifold 118 supports by the fuel conduits of feed passages 136 the nozzles 116 and holds the nozzles 116 in place axially, forcing them against the combustor dome 102 to maintain a consistent gap in each outer air flow passage 138 between each nozzle 116 and the combustor plate 102. The outer air flow passages 138 can provide improved cooling of the combustor dome 102 compared to traditional arrangements. The entire assembly of nozzles 116 and manifold 118 can thus be inserted into combustor dome 102 along the main axis A despite the various injection angles I of the different nozzles 116 during insertion.

Figure 5:
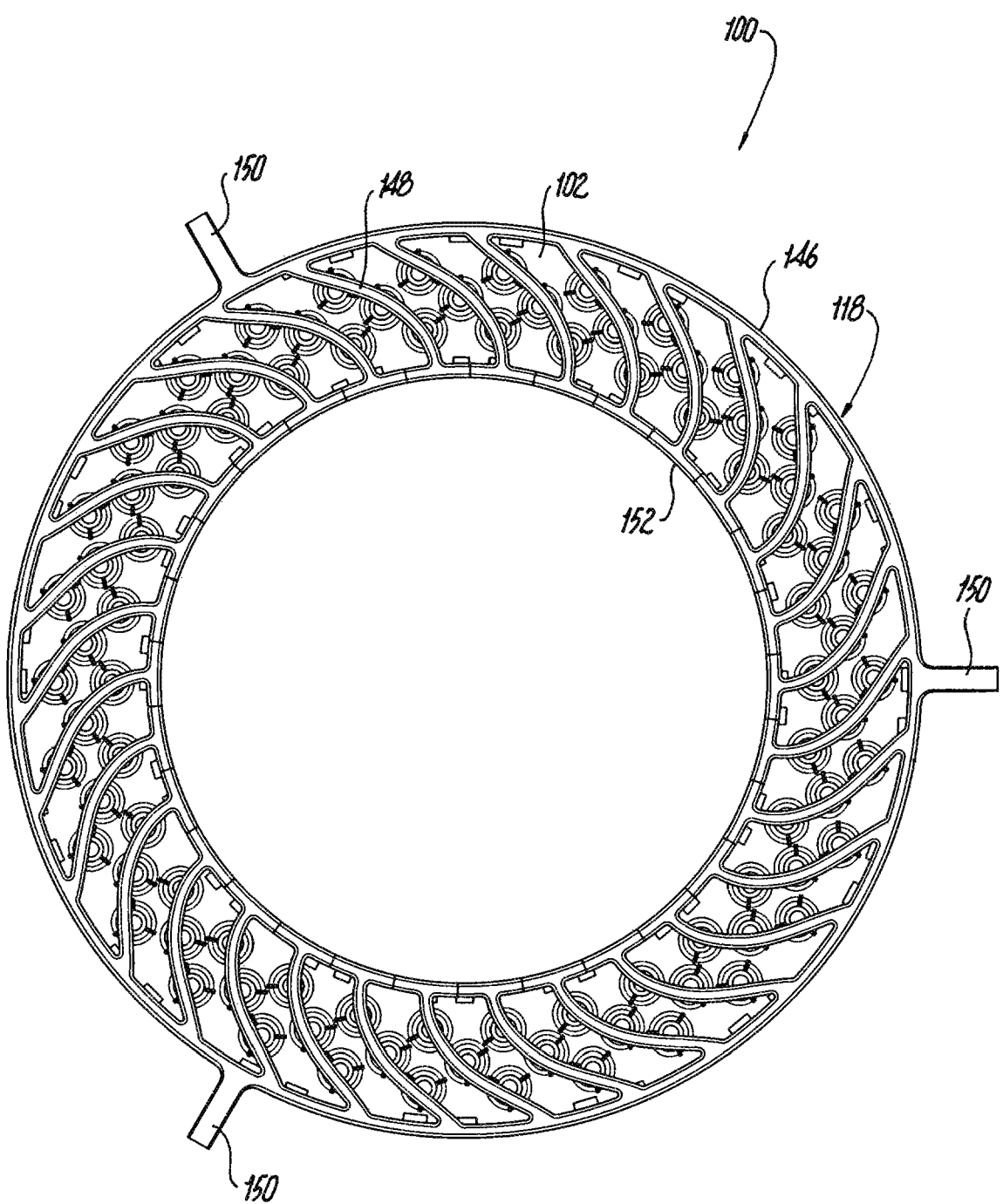
FIG. 5 is an upstream end elevation view of the combustor dome of FIG. 4, showing the manifold.

Referring to FIGS. 2 and 3, manifold 118 includes three fuel circuits 140, 142, and 144, connecting from main feed arms 150, through outer manifold ring 146 and into arms 148 for delivery of separately manifolded fuel to each of the inner, outer, and central sets of nozzles 116. Thus all three sets of nozzles 116 can be staged for separate operation. FIG. 5 shows the complete outer and inner rings 146 and 152, as well as all of the arms 148, each of which delivers fuel to one each of an inner nozzle 116, central nozzle 116, and outer nozzle 116. Feed arms 150 can provide support for manifold 118 in engine 10 of FIG. 1. Inner ring 152 of manifold 118 is devoid of fuel circuits and is circumferentially segmented to accommodate thermal expansion and contraction.

Figure 7:
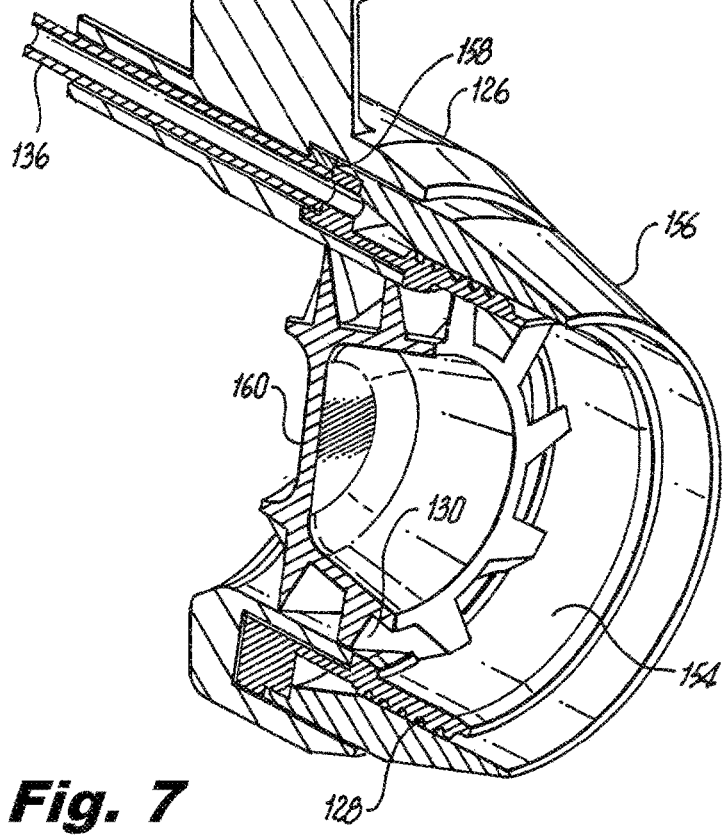

With reference now to FIG. 7, assembly of each nozzle 116 can include brazing inner and outer fuel circuit components 154 and 156 together, and the receptacle 158 for conduit 136 can be drilled. The assembled inner and outer fuel circuits 154 and 156 can be loaded from the downstream side into nozzle assembly 126, which can form a heat shield and can be made of a ceramic material, metallic material, or any other suitable material, and can be unitary with supports 132. The fuel tube of conduit 136 can be assembled into fluid communication with fuel circuit 128, and an inner air swirler 160 can be assembled into air circuit 130. There are thus two air circuits, an inner (130) and outer (138 shown in FIGS. 3 and 4) air circuit sandwiching the fuel circuit 128 for each nozzle 116.

The dome 102 is configured to provide cooling due to air flowing therealong. The dome 102 is configured to provide partial channel heat transfer for cooling the dome 102 and maintaining metering of air flow through the outer air circuit defined between the dome 102 and each of the plurality of nozzles 116. The supports 132 can provide alignment and concentricity for the nozzles 116.

Those skilled in the art will readily appreciate that while shown and described with one fuel circuit and one air circuit in each nozzle, any suitable number of fuel and air circuits can be used without departing from the scope of this disclosure. Those skilled in the art will also readily appreciate that while three fuel circuits corresponding to inner, outer, and central nozzles, any suitable number of circuits or sets of nozzles can be used without departing from the scope of this disclosure. For example, five rings of nozzles can be included, wherein an intermediate set of nozzles is provided with injection angles conforming to the curvature of the combustor dome between the central set of nozzles and each of the inner and outer sets of nozzles.

The arrangements disclosed herein provide controlled spacing between nozzles and combustor domes. These disclosed arrangements increase fuel/air mixing efficiency compared to conventional arrangements by using air which would otherwise bypass the nozzle directly into the mixing path of the nozzle. There is also a reduced part count for reduced cost and weight compared to conventional arrangements. The arrangements disclosed herein can be suitable for ceramic and ceramic matrix material constructions, and can improve heat transfer to the dome plate relative to conventional arrangements.

The methods and systems of the present disclosure, as described above and shown in the drawings, provide for combustor dome systems with superior properties including improved multipoint injection and ease of assembly relative to conventional systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A combustor dome system comprising:
    an annular combustor dome defining a main axis therethrough, the combustor dome including opposed upstream and downstream faces, wherein the upstream face is configured to face upstream toward a compressor discharge space, wherein the downstream face is configured to face downstream toward a combustor space, and wherein the downstream face has a curved cross-sectional profile;
    a plurality of nozzles extending at least partially through the combustor dome from the upstream face to the downstream face for injection of fuel into the combustor space; and
    a nozzle assembly defining a fuel circuit therethrough, wherein the nozzle assembly extends along an injection axis;
    a plurality of supports extending from the nozzle assembly to engage the combustor dome wherein at least one of the supports includes a fuel feed passage fluidly connected with the fuel circuit of the nozzle assembly for fluid communication of fuel from a fuel manifold into the fuel circuit.

2. The system as recited in claim 1, wherein the annular dome includes an upper cross-section and a lower-cross section, wherein in each of the upper and lower cross-sections, there is symmetry in the curved cross-sectional profile across a cylinder defined about the main axis and extending downstream from the downstream face of the combustor dome.

3. The system as recited in claim 1, wherein a cylinder defined about the main axis and extending downstream from downstream face of the combustor dome divides the combustor space into an inner space inside the cylinder and an outboard space outside the cylinder, wherein some of the plurality of nozzles are radially inboard relative to the cylinder, and some of the plurality of nozzles are radially outboard relative to the cylinder.

4. The system as recited in claim 3, wherein the nozzles of the plurality of nozzles that are radially inboard of the cylinder are angled outward toward the cylinder.

5. The system as recited in claim 3, wherein the nozzles of the plurality of nozzles that are radially outboard of the cylinder are angled inward toward the cylinder.

6. The system as recited in claim 1,
    wherein each support in the plurality of supports includes a side face, wherein the side faces are circumferentially spaced apart around an insertion axis that is oblique relative to the injection axis and parallel to the main axis.

7. The system as recited in claim 6, wherein each side face is aligned with the insertion axis.

8. The system as recited in claim 6, wherein each support in the plurality of supports is aerodynamically aligned with the injection axis.

9. The system as recited in claim 6, wherein at least one of the supports is swept on a non-perpendicular angle relative to the injection axis.

10. The system as recited in claim 6, wherein the combustor dome defines an outer air flow passage therethrough for each nozzle aligned with the injection axis thereof, wherein the nozzle assembly is suspended in an outer air flow passage of the combustor dome with an outer air circuit defined through the outer air flow passage outboard of the nozzle assembly.

11. The system of claim 6, wherein the supports provide alignment and concentricity for the nozzles.

12. The system of claim 6, wherein each support includes an end face that faces radially outward relative to the insertion axis, wherein each end face is contained in a respective plane that is parallel to the insertion axis and oblique to the injection axis.

13. The system as recited in claim 1, wherein the fuel manifold is supported by fuel conduits that provide fluid communication from the fuel manifold to the plurality of nozzles, wherein the manifold holds the plurality of nozzles in place axially and forces the plurality of nozzles up against the dome to maintain a constant gap.

14. A combustor dome system comprising:
an annular combustor dome defining a main axis therethrough, the combustor dome including opposed upstream and downstream faces, wherein the upstream face is configured to face upstream toward a compressor discharge space, wherein the downstream face is configured to face downstream toward a combustor space, and wherein the downstream face has a curved cross-sectional profile;
a plurality of nozzles extending at least partially through the combustor dome from the upstream face to the downstream face for injection of fuel into the combustor space, each nozzle in the plurality of nozzles further comprising:
a nozzle assembly defining at least one of a fuel circuit and an air circuit therethrough, wherein the nozzle assembly extends along an injection axis; and
a plurality of supports extending from the nozzle assembly to engage the combustor dome, the supports being circumferentially spaced apart from one another about the injection axis, wherein each support in the plurality of supports includes a side face, wherein the side faces are circumferentially spaced apart around an insertion axis that is oblique relative to the injection axis and parallel to the main axis wherein at least one of the supports includes a fuel feed passage fluidly connected with a fuel circuit of the nozzle assembly for fluid communication of fuel from a manifold into the fuel circuit; and
a fuel manifold in fluid communication with the plurality of nozzles.

15. The system as recited in claim 14, wherein the combustor dome defines an outer air flow passage therethrough for each nozzle aligned with the injection axis thereof, wherein the nozzle assembly is suspended in the outer air flow passage of the combustor dome with an outer second air circuit defined through the outer air flow passage outboard of the nozzle assembly.

16. The system of claim 14, wherein the supports provide alignment and concentricity for the nozzles.

17. The system of claim 14, wherein each support includes an end face that faces radially outward relative to the insertion axis, wherein each end face is contained in a respective plane that is parallel to the insertion axis and oblique to the injection axis.

18. The system as recited in claim 14, wherein each side face is aligned with the insertion axis.

19. The system as recited in claim 14, wherein each support in the plurality of supports is aerodynamically aligned with the injection axis.

20. The system as recited in claim 1, wherein the fuel manifold is supported by fuel conduits that provide fluid communication from the fuel manifold to the plurality of nozzles, wherein the manifold holds the plurality of nozzles in place axially and forces the plurality of nozzles up against the dome to maintain a constant gap.

* * * * *